United States Patent
Koike et al.

(10) Patent No.: US 8,479,249 B2
(45) Date of Patent: Jul. 2, 2013

(54) DISPLAY DEVICE, PROGRAM AND COMPUTER READABLE STORAGE MEDIUM ON WHICH SAID PROGRAM IS STORED

(75) Inventors: Akira Koike, Osaka (JP); Kohichi Takaku, Osaka (JP); Takamasa Shimizu, Osaka (JP); Masahiko Takiguchi, Osaka (JP); Akiyoshi Ohya, Osaka (JP); Atsushi Ogawa, Osaka (JP); Koichi Hirata, Osaka (JP); Osamu Fujii, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/497,539

(22) PCT Filed: Sep. 22, 2010

(86) PCT No.: PCT/JP2010/066440
§ 371 (c)(1),
(2), (4) Date: Mar. 22, 2012

(87) PCT Pub. No.: WO2011/037147
PCT Pub. Date: Mar. 31, 2011

(65) Prior Publication Data
US 2012/0233634 A1  Sep. 13, 2012

(30) Foreign Application Priority Data
Sep. 25, 2009 (JP) .................. 2009-221464

(51) Int. Cl.
*H04N 7/173* (2011.01)
(52) U.S. Cl.
USPC ........... 725/131; 725/100; 725/139; 725/151; 345/581; 345/589; 345/593; 345/594; 345/619; 348/553; 348/571; 348/739

(58) Field of Classification Search
USPC .................. 725/100, 131, 139, 151; 348/553, 348/571, 739; 345/581, 589, 593–594, 619
See application file for complete search history.

(56) References Cited

U.S. PATENT DOCUMENTS 6,263,502 B1  7/2001  Morrison et al.
6,791,624 B1  9/2004  Suga
(Continued)

FOREIGN PATENT DOCUMENTS

EP  2 495 962 A1  9/2012
(Continued)

OTHER PUBLICATIONS

Search Report for corresponding European patent application No. 10818820.2, dated Feb. 26, 2013.

*Primary Examiner* — Mulugeta Mengesha
(74) *Attorney, Agent, or Firm* — Birch, Stewart, Kolasch & Birch, LLP

(57) ABSTRACT

A television receiver for content with which genre information is associated includes: a basic picture quality information receiving section which associates, with a single piece of genre information, a plurality of candidates for picture quality information regarding the content with which the genre information is associated, and which receives basic picture quality information indicating which one of the plurality of candidates is based on; a picture quality correction information creating section which receives picture quality correction information for further correcting the picture quality, and which creates, in accordance with the basic picture quality information and the picture quality correction information, information for correcting the picture quality; and a picture processing section which corrects the picture quality and which creates a picture to be displayed by a liquid crystal display device.

11 Claims, 7 Drawing Sheets

U.S. PATENT DOCUMENTS

| | | | |
|---|---|---|---|
| 8,310,496 B2 * | 11/2012 | Imai et al. | 345/581 |
| 2008/0043031 A1 * | 2/2008 | Jagmag | 345/581 |
| 2008/0129877 A1 * | 6/2008 | Ohno et al. | 348/720 |
| 2009/0096933 A1 * | 4/2009 | Iijima | 348/700 |
| 2010/0053441 A1 * | 3/2010 | Tokashiki et al. | 348/576 |
| 2010/0271390 A1 * | 10/2010 | Tran et al. | 345/619 |

FOREIGN PATENT DOCUMENTS

| | | |
|---|---|---|
| JP | 2001-119644 A | 4/2001 |
| JP | 2001-515675 A | 9/2001 |
| JP | 2004-228788 A | 8/2004 |
| JP | 2006-13618 A | 1/2006 |
| JP | 2007-147828 A | 6/2007 |
| JP | 2008-225372 A | 9/2008 |
| WO | 2008/021710 A | 2/2008 |

* cited by examiner

FIG. 5

COLOR SATURATION

|  | FILM | VIDEO | SPORTS |
|---|---|---|---|
| PATTERN 1 | 100% | 110% | 115% |
| PATTERN 2 | 105% | 115% | 125% |
| PATTERN 3 | 120% | 130% | 140% |

SHARPNESS

|  | FILM | VIDEO | SPORTS |
|---|---|---|---|
| PATTERN 1 | 0 | +2 | +4 |
| PATTERN 2 | +2 | +4 | +6 |
| PATTERN 3 | +4 | +6 | +8 |

GAMMA

|  | FILM | VIDEO | SPORTS |
|---|---|---|---|
| PATTERN 1 | LINEAR | S-CHARACTERISTICS (WEAK) | S-CHARACTERISTICS (WEAK) |
| PATTERN 2 | LINEAR | S-CHARACTERISTICS (MEDIUM) | S-CHARACTERISTICS (MEDIUM) |
| PATTERN 3 | S-CHARACTERISTICS (WEAK) | S-CHARACTERISTICS (STRONG) | S-CHARACTERISTICS (STRONG) |

DISPLAY DEVICE, PROGRAM AND COMPUTER READABLE STORAGE MEDIUM ON WHICH SAID PROGRAM IS STORED

TECHNICAL FIELD

The present invention relates to a display apparatus, a program, a computer-readable storage medium containing the program.

BACKGROUND ART

As technologies for correcting picture quality according to a user's preference during the playback of a program, Patent Literatures 1 to 3 have been reported, for example.

Patent Literature 1 discloses an image display apparatus that determines picture quality parameters by presenting a plurality of sample images differing in picture quality parameters and by letting a user to select his/her desired sample image.

Patent Literature 2 discloses a television receiver that determines picture quality by letting a user to select from among sample moving images differing in quality.

Patent Literature 3 discloses a system which determines the characteristics, such as topic and theme information, of a program currently broadcast on TV and which adapts data such as audio and video set values to a table of predefined optimum receiver characteristics stored in a storage unit.

CITATION LIST

Patent Literature 1

Japanese Patent Application Publication, Tokukai, No. 2007-147828 A (Publication Date: Jun. 14, 2007)

Patent Literature 2

Japanese Patent Application Publication, Tokukai, No. 2001-119644 A (Publication Date: Apr. 27, 2001)

Patent Literature 3

Japanese Translation of PCT International Publication, Tokuhyo, No. 2001-515675 A (Publication Date: Sep. 18, 2001)

SUMMARY OF INVENTION

Technical Problem

Incidentally, a user's preference on picture quality often varies among genres of programs that he/she watches. For example, the user may be satisfied with the general settings when he/she watches a movie, but the user may prefer the vivid settings to the general settings when he/she watches a sports program. Meanwhile, the user may prefer soft tones of pictures to the general settings when he/she watches a movie, but the user may prefer clear pictures when he/she watches other genres. Furthermore, the user may feel discontented with set values originally registered in the television as picture set values for each genre, because such set values may not suit the user's preference.

In view of this, the present invention provides a display apparatus that displays pictures with picture quality adapted for a genre of content and for a user's preference.

Solution to Problem

In order to solve the foregoing problems, a display apparatus according to the present invention is a display apparatus for receiving and displaying content with which genre information is associated, the genre information indicating a type of the content, including: basic picture quality information receiving means which associates, with a single piece of the genre information, a plurality of candidates for picture quality information indicating picture quality of a display of the content with which the genre information is associated, and which receives an entry, by a user, of basic picture quality information indicating which one of the plurality of candidates for the picture quality information the display of the content is based on; high-level picture quality correction information creating means which receives an entry, by the user, of picture quality correction information for, by using picture quality based on the basic picture quality information as a benchmark, further correcting the picture quality, and which creates, in accordance with the basic picture quality information and the picture quality correction information, high-level picture quality correction information for correcting the picture quality; and picture processing means which corrects the picture quality in accordance with the high-level picture quality correction information, and which creates a picture to be displayed by a display section included in the display apparatus.

According to the foregoing configuration, selecting the desired piece of picture quality information from among the plurality of candidates for the picture quality information set in advance allows easily setting the picture quality of the content by using the basic picture quality information for each genre; furthermore, creating the high-level picture quality correction information makes it possible to make picture quality adjustment that more accurately suits the user's preference. Therefore, pictures can be displayed with picture quality adapted for the genre of the content and for the user's preference.

It should be noted that the display apparatus may be realized by a computer. In this case, a program for realizing the content playback apparatus in a computer by causing the computer to operate as each of the means and a computer-readable recording medium containing the program are encompassed in the scope of the present invention.

Advantageous Effects of Invention

As described above, a display apparatus according to the present invention is a display apparatus for receiving and displaying content with which genre information is associated, the genre information indicating a type of the content, including: basic picture quality information receiving means which associates, with a single piece of the genre information, a plurality of candidates for picture quality information indicating picture quality of a display of the content with which the genre information is associated, and which receives an entry, by a user, of basic picture quality information indicating which one of the plurality of candidates for the picture quality information the display of the content is based on; and high-level picture quality correction information creating means which receives an entry, by the user, of picture quality correction information for, by using picture quality based on the basic picture quality information as a benchmark, further correcting the picture quality, and which creates, in accordance with the basic picture quality information and the picture quality correction information, high-level picture quality correction information for correcting the picture quality. This brings about such an effect that pictures can be displayed with picture quality adapted for the genre of the content and for the user's preference.

BRIEF DESCRIPTION OF DRAWINGS

FIG. 1 schematically shows a configuration of an embodiment of a display apparatus according to the present invention.

FIG. 2 is a flow chart showing an example of operation in the embodiment of the display apparatus according to the present invention.

FIG. 3 shows an example of a screen image in the embodiment of the display apparatus according to the present invention.

FIG. 4 shows an example of a screen image in the embodiment of the display apparatus according to the present invention.

FIG. 5

FIG. 5 shows examples of coefficients of correction of sample images that are displayed by a television receiver in the embodiment of the display apparatus according to the present invention.

FIG. 6 shows an example of a screen image in the embodiment of the display apparatus according to the present invention.

FIG. 7 shows an example of a screen image in the embodiment of the display apparatus according to the present invention.

FIG. 8 shows an example of a screen image in the embodiment of the display apparatus according to the present invention.

DESCRIPTION OF EMBODIMENTS

An embodiment of the present invention is described in detail below with reference to FIGS. 1 through 8. It should be noted that although the following description gives various limitations preferred for the present invention to be carried out, the technical scope of the present invention is not to be limited to the embodiment and the description of the drawings below.

(Configuration of a Television Receiver 10]

Figure 1:
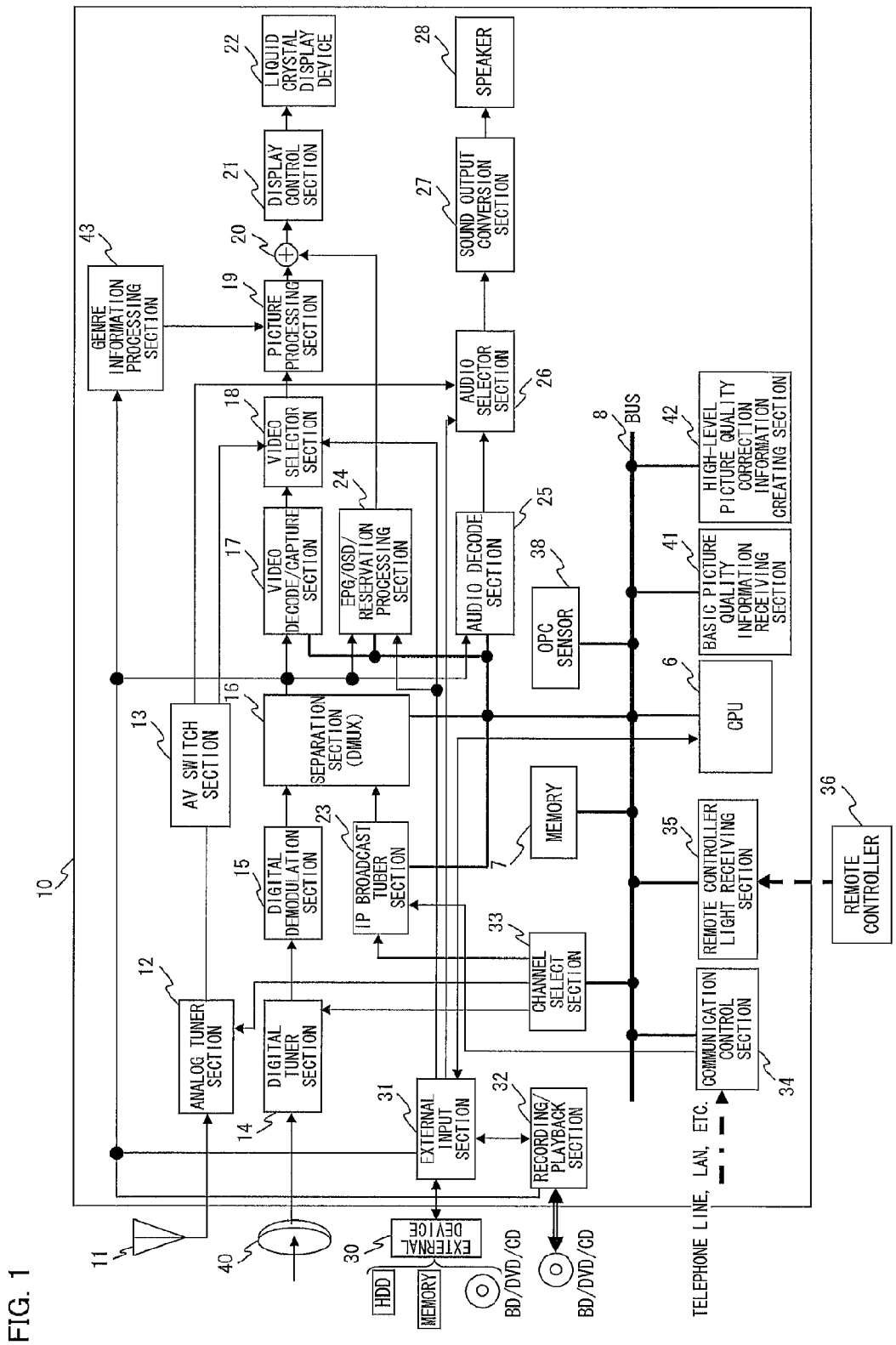
FIG. 1

First, a configuration of a television receiver including a display apparatus according to the present invention is schematically described with reference to FIG. 1. FIG. 1 schematically shows a configuration of a television receiver 10.

In FIG. 1, the television receiver 10 (display apparatus) constitutes the whole of a television receiver having a liquid crystal display device 22 (display means) having a screen size of 16:9 (1920×1010 dots). The television receiver 10 has a CPU 6 and a memory 7 both connected to a bus 8, and the operation of the television receiver 10 is controlled by the CPU 6 and various types of control program stored in the memory 7. That is, the television receiver shown in FIG. 1 is controlled by a computer system including the CPU 6, and a program for causing the television receiver to operate by the computer system is stored in the memory 7.

The memory 7 is normally constituted by a RAM, but may include a ROM in a part thereof. Further, the memory 7 may also include a rewritable flash memory or the like. The memory 7 has stored therein an OS for causing the CPU to operate, various types of control software, etc., and also has stored therein data on program information such as EPG data received through broadcast waves, OSD image data necessary for carrying out an OSD display, etc. Further, the memory 7 has a work region that serves as a work memory necessary for various types of control operation.

The television receiver 10 is provided with an analog tuner section 12, as well as a digital tuner section 14, so as to be able to receive analog broadcasts. Further, the television receiver 10 has an external input section 31 to which any of the following various external devices 30 can be connected: solid memories such as HDDs and SD cards; disk devices such as BD (blue-ray disc) players, DVD players, and CD players; etc. Furthermore, the television receiver 10 has a BD/DVD/CD recording/playback section 32 contained in a main body thereof. Furthermore, the television receiver 10 includes an IP broadcast tuner section 23 so as to be able to receive IP broadcasts.

Besides, the television receiver 10 has an AV switch section 13, a digital demodulation section 15, a separation section (DMUX) 16, a video decode/capture section 17, a video selector section 18, a picture processing section 19 (picture processing means), an adding circuit 20, a display control section 21, the liquid crystal display device 22, an EPG/OSD/reservation processing section 24, an audio decode section 25, an audio selector section 26, a sound output conversion section 27, a speaker 28, a channel select section 33, a communication control section 34, a remote controller light receiving section 35, a basic picture quality information receiving section 41 (basic picture quality information receiving means), a high-level picture quality correction information creating section 42 (high-level picture quality correction information creating means), and a genre information processing section 43 (genre information processing means). The television receiver 10 is further provided with an OPC sensor 38 for detecting ambient brightness. It should be noted that the OPC sensor 38 be an illuminance sensor including a low-pass filter. This makes it possible to smoothly acquire illuminance by alleviating a temporary change such as that which is caused by a person passing in front of the sensor.

The analog tuner section 12, which serves to select a channel of analog television broadcast signals that is received through an antenna 11 for analog broadcast reception, selects a channel in accordance with a channel select instruction from the channel select section 33. A received signal from the analog tuner section 12 is separated by the AV switch section 13 into a sound signal and a picture signal. The picture signal is inputted to the video selector section 18, and the sound signal is inputted to the audio selector section 26.

The digital tuner section 14, which serves to select a channel of digital television broadcast signals that is received through an antenna 40 for digital broadcast reception, selects a to-be-received channel in accordance with a channel select instruction from the channel select section 33. A received signal from the digital tuner section 14 is demodulated by the digital demodulation section 15 and sent to the separation section (DMUX) 16.

The IP broadcast tuner section 23, which serves to an IP broadcast channel that is received through the communication control section 34 connected to a telephone line, a LAN, or the like, selects a particular to-be-received IP broadcast channel in accordance with a channel select instruction from the channel select section 33 and sends an output to the separation section (DMUX) 16.

The separation section (DMUX) 16 separates multiplexed picture data and sound data inputted from the digital demodulation section 15 or from the IP broadcast tuner section 23, sends the picture data to the video decode/capture section 17, and sends the sound data to the audio decode section 25.

Furthermore, the separation section (DMUX) 16 extracts data such as EPG data contained in a broadcast signal, and sends the data to the EPG/OSD/reservation section 24. It should be noted that the broadcast wave signal extracted by the separation section (DMUX) 16 is recorded in the memory 7, as needed, by the CPU 6 carrying out write control.

The video decode/capture section 17 decodes the picture data separated by the separation section (DMUX) 16 or captures, as a still image, video information contained in the picture data. The picture signal decoded by the video decode/capture section 17 is sent to the video selector section 18. As already mentioned, the video selector section 18 has received a picture signal from the analog tuner section 12, and has also received a picture signal from the external input section 31. In accordance with a control signal from the CPU 6, the video selector section 18 selects and outputs one of these input picture signals, and sends the picture signal to the picture processing section 19.

The picture processing section 19 performs picture processing such as noise reduction, sharpness adjustment, and contrast adjustment on the picture signal inputted thereto, thereby converting the picture data into an optimum picture signal for the liquid crystal display device 22.

Further, the picture processing section 19 creates a picture whose picture quality has been corrected in accordance with high-level picture quality correction information, which will be described later. Further, the professional settings, which will be described later, are configured while the user is viewing an image displayed by the liquid crystal display device 22. In so doing, if genre information of content from which the image is derived and genre information for which the professional settings are configured are different from each other, the picture processing section 19 causes the liquid crystal display device 22 to display a caption explaining that the respective pieces of genre information are different from each other.

The display control section 21 is a part including a driving circuit for causing the liquid crystal display device 22 to display received picture data, and sends, to the liquid crystal display device 22, picture data obtained by the adders adding, to the picture data sent from the picture processing section 19, electronic program guide (EPG) data or OSD (on-screen display) data sent from the EPG/OSD/reservation section 24. The liquid crystal display device 22 displays the incoming picture data on the screen.

The EPG/OSD/reservation section 24 further performs processing for a scaling display in accordance with the present invention.

The audio decode section 25 serves to decode the sound data sent from the separation section (DMUX) 16. The audio decode section 25 sends the sound signal thus decoded to the audio selector section 26.

The audio selector section 26 receives the sound signal from the AV switch section 13, a sound signal from the external input section 31, and the sound signal from the audio decode section 25, selects, under control of the CPU 6, a sound signal corresponding to the picture signal selected by the video selector section 18, and sends the sound signal to the speaker 28 through the sound output conversion section 27. The sound output conversion section 27 converts the sound signal thus received into an optimum signal for playback in the speaker 28 and supplies the signal to the speaker 28.

The remote controller light receiving section 35 serves to receive an optical signal from a remote controller 36 and receive a control signal from the remote controller 36. As will be described later, a transition to a scaling display, the selection, determination, etc. of various buttons during a scaling display, and instructions from the viewer are made through the remote controller 36.

The EPG/OSD/reservation section 24 creates an electronic program guide in accordance with regularly updated and saved EPG data, and draws OSD data saved in advance in the memory 7. The OSD data is data for drawing various types of information stored in advance in the memory 7, such as a setting menu screen, a volume gauge, current time, and a channel selected. Further, the EPG/OSD/reservation section 24 performs processing such as making a reservation for a program by using the electronic program guide.

The communication control section 34 carries out control so that communication is established through a network such as a telephone line, a LAN, or the Internet.

The basic picture quality information receiving section 41 associates, with a single piece of genre information, a plurality of candidates for picture quality information indicating the picture quality of content, receives an instruction from the user for selecting one of the plurality of candidates for the picture quality information, and recognizes the selected picture quality information as basic picture quality information. Specifically, the basic picture quality information receiving section 41 creates a plurality of images corrected in accordance with the plural pieces of picture quality information, causes the liquid crystal display device 22 to display the plurality of images, and receives, through the remote controller light receiving section 35, an instruction to select a single image from among the plurality of images, thereby receiving the basic picture quality information. That is, the basic picture quality information is a single piece of picture quality information selected by the user from among the plural pieces of picture quality information. The basic picture quality information thus received is transmitted to the memory 7 in association with the genre information, and the memory 7 stores the basic picture quality information in association with the genre information.

The high-level picture quality correction information creating section 42 further receives an entry, by the user, of picture quality correction information for, by using picture quality based on the basic picture quality information as a benchmark, correcting the picture quality, and creates, in accordance with the basic picture quality information and the picture quality correction information, high-level picture quality correction information for correcting the picture quality. For example, such settings can be configured that after selecting the basic picture quality information, the user can, by using picture quality based on the basic picture quality information as a benchmark, correct the picture quality so that the picture quality further suits the user's preference. Information for making such a correction is the picture quality correction information, and information obtained by adding the picture quality correction information to the basic picture quality information, i.e., information for, with respect to picture quality received by the digital tuner section 14 or the like, correcting the picture quality by taking into account the picture quality correction information in addition to the basic picture quality information is the high-level picture quality correction information.

By thus first selecting the basic picture quality information through selecting, from among the plurality of images, an image whose picture quality is close to the user's favorite picture quality and then entering the high-level picture quality correction information, the user can more quickly set to his/her favorite picture quality. That is, the user can set to his/her favorite picture quality simply by setting to picture quality that is close to his/her favorite picture quality to some extent and then making adjustment to the picture quality, instead of carrying out an operation for setting his/her favorite picture quality from the initial values. This makes it possible to more quickly and more easily adjust picture quality than in a case where various parameters are adjusted from the initial values.

After creating the high-level picture quality correction information, the high-level picture quality correction information creating section 42 sends the high-level picture quality correction information to the memory 7 in association with the genre information, and the memory 7 stores the high-level picture quality correction information in association with the genre information. The term "state as to receive the picture quality correction information" in the present invention means a state after the user has chosen the settings for making an entry of the picture quality correction information and before the user chooses not to make any more entry, e.g., after making that entry.

Further, the television receiver 10 includes the genre information processing section 43 (genre information processing means).

The genre information processing section 43 receives content from any one of the genre information processing section 43, the separation section 16, the external input section 31, and the recording/playback section 32, and determines and acquires genre information of the content from the member from which the content was received.

For example, in the case of digital broadcasting, genre information is categorized into major categories and medium categories associated with one another. Examples of major categories include "News/Reports", "Information/Tabloid Show", "Variety Show", "Movie", "Sports", etc. In the case of the major category "News/Reports", examples of medium categories include "Regular/General", "Local/Regional", "Weather", etc. Generally, a plurality of these major categories of genre information are associated with each broadcast program (content). For example, in the case of sports news, the major categories "News/Reports" and "Sports" of genre information are associated and, furthermore, some medium categories belonging to these major categories are associated. When the separation section 16, the external input section 31, or the recording/playback section 32 receives content with which these pieces of genre information are associated, the genre information processing section 43 acquires the genre information associated with the content. The genre information acquired here may be part or all of the genre information associated with the content. Further, as will be described later, the genre information processing section 43 can also determine, from the frame frequency or the like of content, whether or not the content is derived from a film, for example.

Incidentally, the memory 7 saves default coefficients of picture quality correction, basic picture quality information, or high-level picture quality correction information in association with genre information. That is, as will be described in section [Operation of the Television Receiver 10] below, default coefficients of picture quality correction are associated with each genre unless the simple settings are configured; basic picture quality information is associated with each genre if the simple settings are configured but the professional settings are not configured; or high-level picture quality correction information is associated with each genre by configuring the professional settings. Accordingly, the picture processing section 19 acquires, from the memory 7, coefficients of picture quality correction or the like associated with genre information acquired by the genre information processing section 43, performs processing for correcting a picture in accordance with the coefficients of picture quality correction or the like, and transmits the picture to the display control section 21.

Although the present embodiment describes a case where content that is received by the television receiver is a digital broadcast, the same processing is also possible in the case of an analog broadcast. That is, in the case of an analog broadcast, genre information can be acquired by carrying out an audio analysis, an image analysis, etc. to extract, as genre information, a keyword representing the type of the program. Moreover, coefficients of picture quality correction or the like are acquired in accordance with the keyword.

[Operation of the Television Receiver 10]

Figure 2:
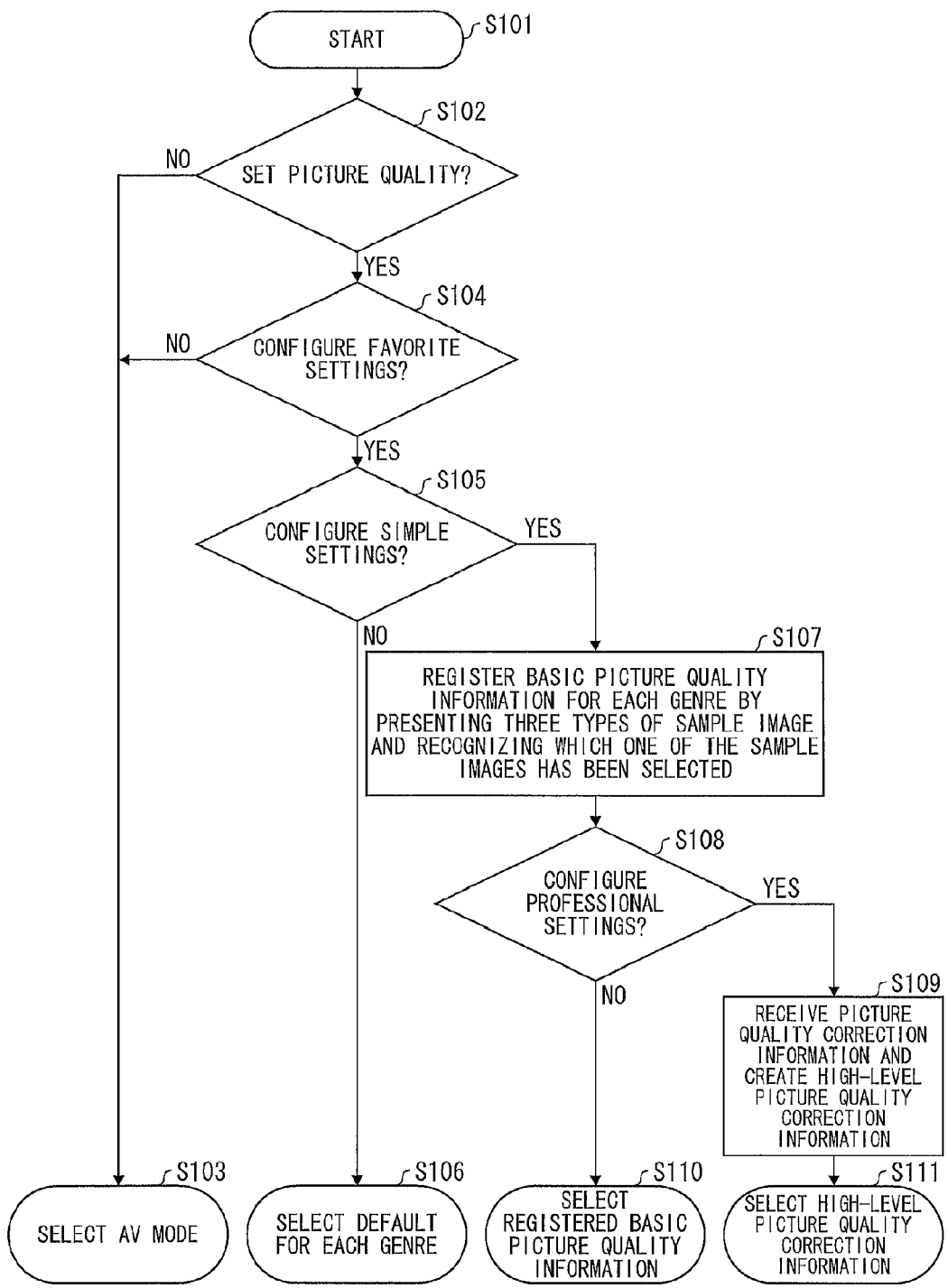
FIG. 2

Next, the operation of the television receiver 10 is described with reference to FIGS. 2 through 8. FIG. 2 is a flow chart showing an example of operation in the television receiver 10.

The present embodiment describes a case where the television receiver 10 is first powered on. First, the power is turned on for the first time (Step S101). Next, the television receiver 10 displays a screen image asking the user whether or not to configure the settings for picture quality, and displays a screen image for receiving an instruction as to whether or not to configure the settings for picture quality (Step S102). If the television receiver 10 receives an instruction not to configure the settings for picture quality (No in Step S102), the television receiver 10 proceeds to Step S103. In Step S103, the television receiver 10 causes the picture processing section 19 to select an AV mode in processing picture quality. The AV mode is a combination of parameters of picture quality correction information such as luminance and contrast, and is registered in advance in the memory 7. In this case, the picture processing section 19 corrects picture quality in accordance with the AV mode, and the liquid crystal display device 22 displays a picture in accordance with the picture quality thus corrected.

Figure 3:
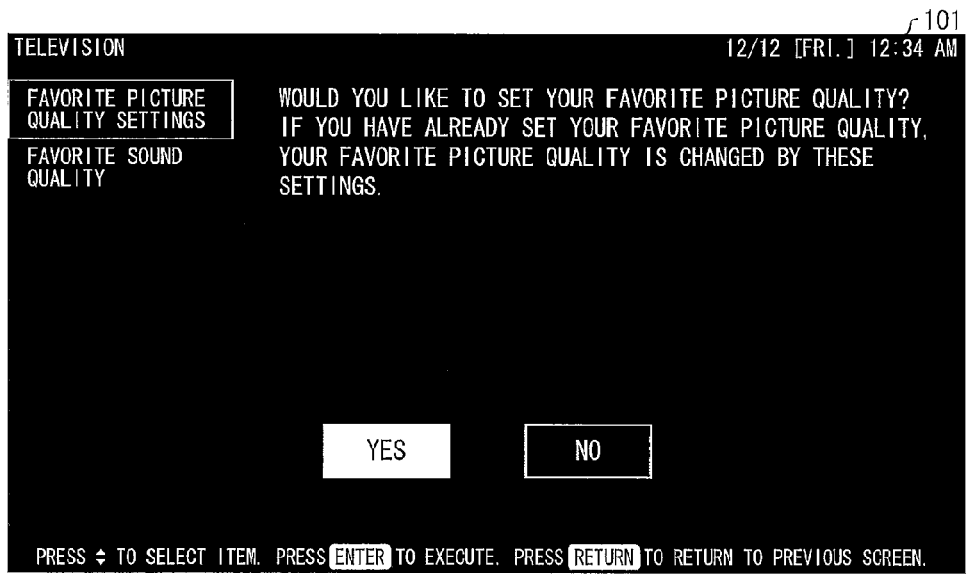
FIG. 3

If, in Step S102, the television receiver 10 receives an instruction to configure the settings for picture quality (Yes in Step S102), the television receiver 10 displays a screen image for receiving an instruction as to whether or not to configure the favorite settings (Step S104). An example of a screen image at this point in time is shown in FIG. 3. FIG. 3 is an example of a screen image that is displayed by the television receiver 10. As shown in FIG. 3, a screen image 101 displays a message asking the user whether or not to configure the favorite settings. The term "favorite settings" here means configuring the settings for picture quality to suit the user's preference, and are composed of the "simple settings" and the professional settings", which will be described later. If the television receiver 10 receives an instruction not to configure the favorite settings (No in Step S104), the television receiver 10 proceeds to Step S103. If, in Step S104, the television receiver 10 receives an instruction to configure the favorite settings for picture quality (Yes in Step S104), the television receiver 10 displays a screen image for receiving an instruction as to whether or not to configure the simple settings (Step S105).

The simple settings are the settings in which to receive basic picture quality information by creating sample images corrected in accordance with plural pieces of picture quality information, causing the liquid crystal display device 22 to display the sample images, and receiving an select instruction for selecting a single image from among the plurality of sample images.

If the television receiver 10 receives an instruction not to configure the simple settings (No in Step S105), the television receiver 10 proceeds to Step S106. In Step S106, the picture processing section 19, in processing picture quality, selects default values based on which picture quality has been set for each genre. That is, the memory 7 has stored in advance therein the default values of coefficients of picture quality correction for correcting picture quality, with the default values in association with genre information of content, and in processing picture quality, the picture processing section 19 acquires, from the genre information processing section 43, the genre information of the content to be displayed, acquires, from the memory 7, the default values associated with the genre information, and processes picture quality in accordance with the default values.

Figure 4:
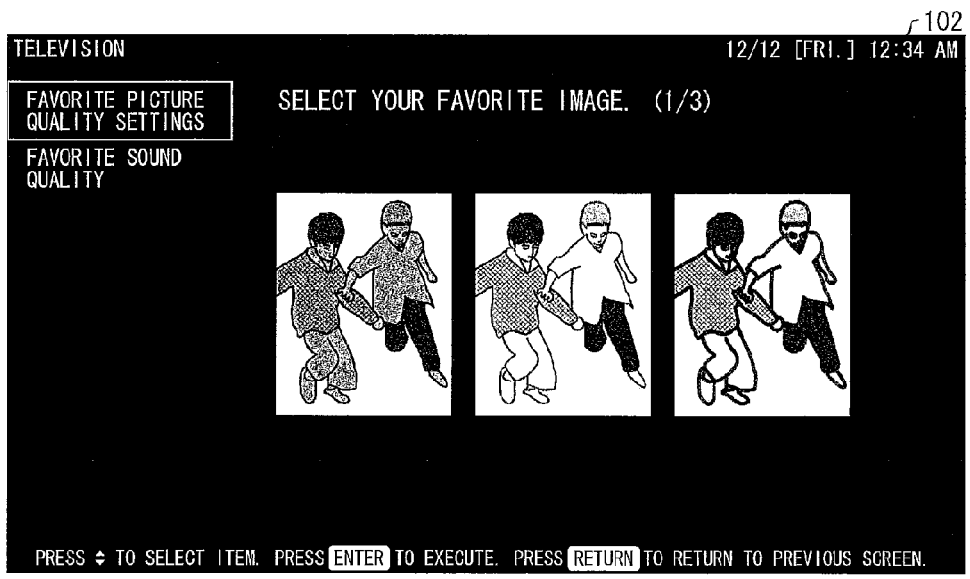
FIG. 4

If the television receiver 10 receives an instruction to configure the simple settings (Yes in Step S105), the television receiver 10 proceeds to Step S107. An example of a screen image for configuring the simple settings is shown in FIG. 4. FIG. 4 is an example of a screen image that is displayed by the television receiver 10. As shown in FIG. 4, in Step S107, a screen image 102 displays three sample images processed in accordance with three types of candidate picture quality information, and the user selects which of the sample images suits his/her preference. By thus presenting the sample images, the user is allowed to intuitively select his/her favorite image.

More specifically, in the present embodiment, three sample images are presented for each single genre, and there are three types of genre. The three types of genre are "FILM", "VIDEO", and "SPORTS". The "FILM" is a genre of content derived from a film, taken at 24 Hz, and pulled down to 3:2. The "VIDEO" is a genre of content derived from a normal broadcast at 60 Hz. The "SPORTS" is a genre of content with which the genre information of sports is associated. All of these genres are discriminated among by the genre information processing section 43. The sample images are each corrected in a different pattern. FIG. 5 shows patterns in which the sample images are corrected. FIG. 5 shows examples of coefficients of correction of sample images that are displayed by the television receiver 10. It should be noted that the genre information is not to be limited to the three types, namely "VIDEO", "FILM", and "SPORTS", and the genre information processing section 43 may be configured to discriminate among various genres such as "News/Reports", "Information/Gossip Show" "Variety Show", and "Movie".

As shown in FIG. 5, the color saturation, sharpness, gamma of the sample images are corrected. For example, the sample images in the genre of "FILM" are processed in Patterns 1 to 3, so that the sample image in Pattern 1 has a color saturation of 100%, a sharpness of 0, and a linear gamma, that the sample image in Pattern 2 has a color saturation of 105%, a sharpness of +2, and a linear gamma, and that the sample image in Pattern 3 has a color saturation of 120%, a sharpness of +4, and a gamma of S-characteristics (weak). These three sample images processed in Patterns 1 to 3 are presented for each genre, so that the user can select which of Patterns 1 to 3 suits his/her preference. This causes the memory 7 to store genre information and basic picture quality information in association with each other, e.g., the genre "FILM" and the coefficients of picture quality correction (basic picture quality information) of Pattern 1 in association with each other, the genre "VIDEO" and the coefficients of picture quality correction (basic picture quality information) of Pattern 2 in association with each other, and the genre "SPORTS" and the coefficients of picture quality correction (basic picture quality information) of Pattern 3 in association with each other.

It should be noted, in the examples described here, that Pattern 2 is a pattern for making normal picture quality corrections, that Pattern 1 is a pattern for making so-called "light" picture quality corrections, and that Pattern 3 is a pattern for making so-called "heavy" picture quality corrections. Being "light" means, in terms of color saturation, that the colors tones are soft, means, in terms of sharpness, that the contours are blurry with soft tones of pictures, and means, in terms of gamma, that the gamma is linear or that the S-characteristics are weaker, for example. Being "heavy" means, in terms of color saturation, that the colors are more vivid, means, in terms of sharpness, that the contours are more emphasized (the initial value is 0 and a greater positive (+) value means a stronger sharpness), and means, in terms of gamma, that that the S-characteristics are stronger, for example.

Next, the television receiver 10 proceeds to Step S108. In Step S108, the television receiver 10 recognizes whether or not the user would like the professional settings. For example, if the user selects the professional settings from the menu screen (Yes in Step S108), the television receiver 10 proceeds to the professional settings (Step S109), and if the professional settings are not selected after Step S107, the television receiver 10 proceeds to Step S110. In Step S110, the picture processing section 19, in processing picture quality, selects the basic picture quality information associated with the genre information.

In Step S109, the professional settings are configured. The professional settings are the settings in which for the user to further adjust, according to his/her preference, the picture quality selected in the simple settings described above. That is, the professional settings are called this way because they are the settings for professionals who have a more detailed knowledge of picture quality. In this step, picture quality correction information for further correcting picture quality by using basic picture quality information as a benchmark is received. Then, the high-level picture quality correction information creating section 42 creates high-level picture quality correction information for correcting picture quality by taking into account the picture quality correction information in addition to the basic picture quality information.

Figure 6:
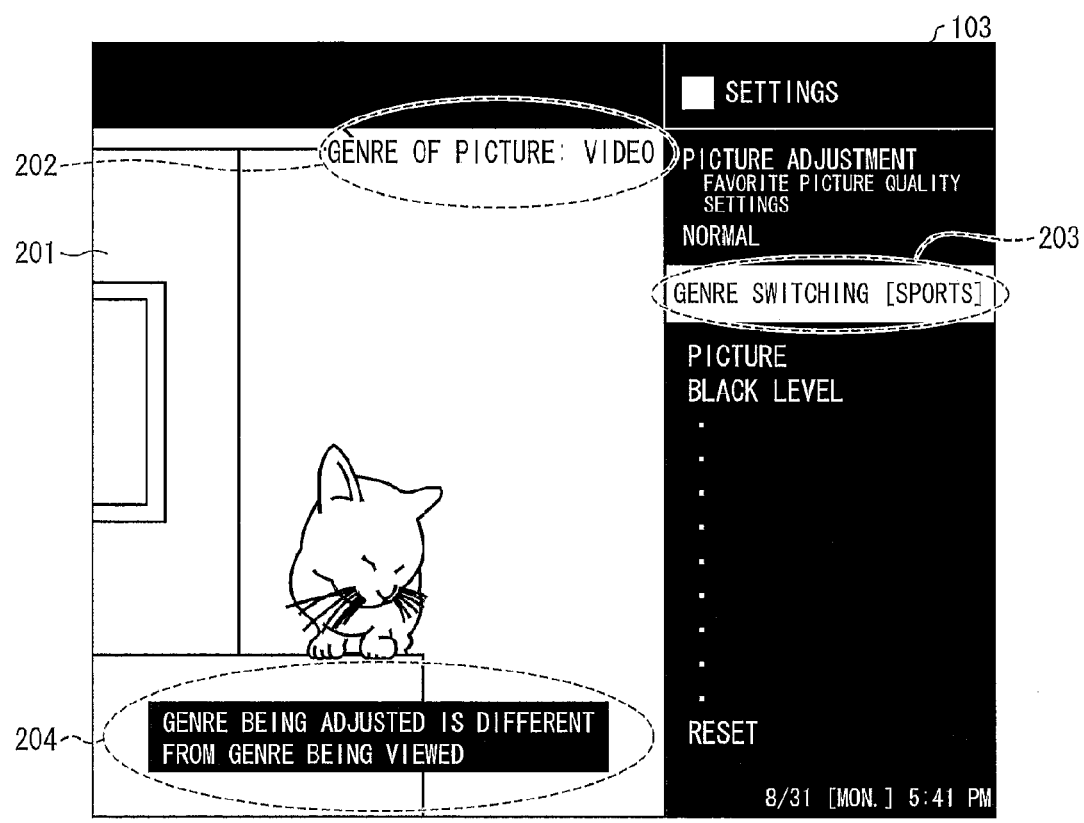
FIG. 6
Figure 7:
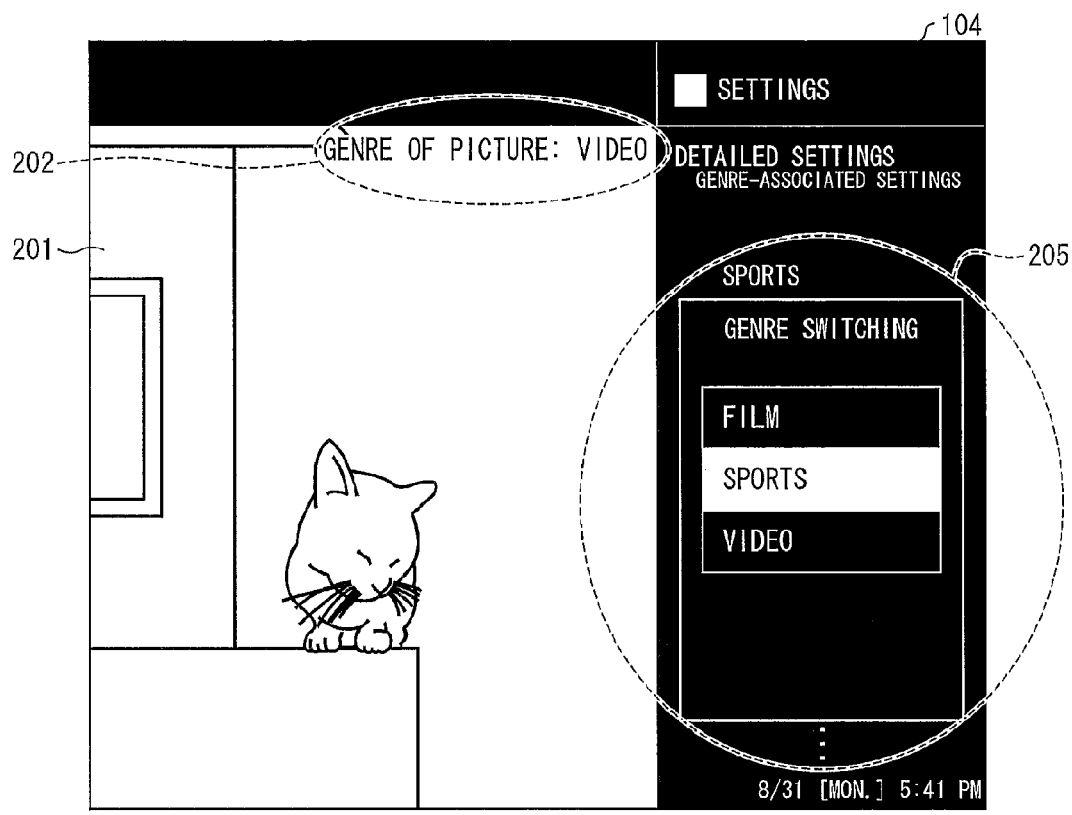
FIG. 7
Figure 8:
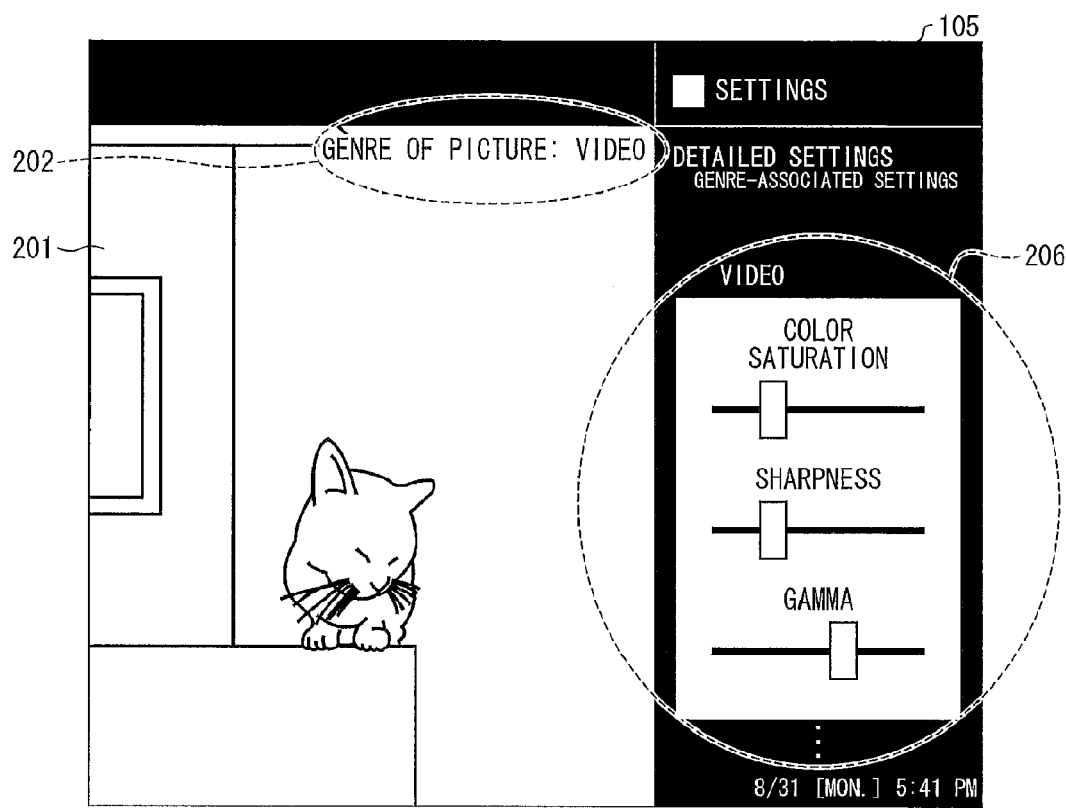
FIG. 8

Examples of screen images for configuring the professional settings are shown in FIGS. 6 through 8. FIGS. 6 through 8 show examples of screen images that are displayed by the television receiver 10.

As shown in FIG. 6, a screen image 103 displays an image in a region 201. The image in the region 201 is a still image or moving image obtained by capturing a broadcast program currently received and broadcast on the channel selected by the user. Displayed in a region 202 is a genre of the broadcast program. Displayed in a region 203 is a genre currently selected as a target for which the professional settings are configured. In the example shown in FIG. 6, the genre selected as the target for which the professional settings are configured and the genre of the broadcast program are different from each other. Even by configuring the professional settings in such a state, a result of the profession settings cannot be reflected in the still image/moving image, so that the user cannot confirm the result of the professional settings. Displayed in a region 204 for this reason is a warning indicating that the genre selected as the target for which the professional settings are configured and the genre of the broadcast program are different from each other.

This makes it necessary for the user select a genre for which the professional settings are to be configured. Pointing the cursor to the region 203 of FIG. 6 and choosing it causes the screen image to change so that the user can change genres as shown in a screen image 104 of FIG. 7. Displayed in a region 205 of FIG. 7 is an image for changing genres. With the genre "SPORTS" currently selected, the genre "VIDEO", which is the same genre as that displayed in the region 201, can be selected by moving the cursor one step below. This makes it possible to match the genre selected as the target for which the professional settings are configured and the genre of the broadcast program. It should be noted that the aforementioned warning is erased when the screen image 104, which is a screen image for selecting a genre for which the professional settings are to be configured, appears. Further, it is also possible to automatically change the menu to the same genre according to the genre of the picture.

After the selection of a genre for which the professional settings are to be configured, an image for adjusting the parameters of picture quality is displayed as shown in a screen image 105 of FIG. 8. Adjusting bars for adjusting color saturation, sharpness, and gamma are displayed in a region 206, and the user uses the remote controller 36 to send an instruction to adjust the parameters, and the high-level picture quality correction information creating section 42 receives the instruction as picture quality correction information and creates high-level picture quality correction information by combining the picture quality correction information with the basic picture quality information. The high-level picture quality correction information thus created is transmitted to the memory 7 in association with the genre information, and the memory 7 stores the genre information and the high-level picture quality correction information in association with each other. The present embodiment has been described by taking color saturation, sharpness, and gamma as examples of parameters to be adjusted. However, the parameters for adjusting picture quality are not to be limited to these. For example, the television receiver 10 may be configured such that various parameters such as luminance and black level can be adjusted.

Next, the television receiver 10 proceeds to Step S111. In Step S111, the picture processing section 19, in processing picture quality, selects the high-level picture quality correction information associated with the genre information.

Although the present embodiment has described a case where the simple settings or the professional settings are configured immediately after the power is first turned on, this does not imply any limitation. The television receiver 10 may also be configured such that the simple settings or the professional settings can be configured as long as the power is on.

It should be noted that the television receiver 10 may be configured such that when the user attempts to configure the simple settings after the professional settings, a warning is displayed which warns the user that the user's previously set favorite adjustment is initialized. Let it be assumed, for example, that the user selects Pattern 3 in the genre "VIDEO" in the simple settings (selects a sharpness of +6) and then adjusts the sharpness to +5 in the professional settings. In this case, however, the user may wish to configure the simple settings again. Configuring the simple settings again causes the result of the simple settings previously configured to be cleared, causes the sharpness to be set to +2, +4, or +6, and ultimately causes the user's previous favorite adjustment to be cleared. This is why a warning is displayed which warns the user that the user's previous favorite adjustment is cleared. This makes it possible to interrupt the operation when the user attempts, without careful consideration or by mistake, to configure the favorite settings again.

Further, the television receiver 10 may be configured such that a plurality of users can be registered, that the memory 7 saves a result of the favorite settings for each genre for each user, and that picture quality is changed according to the user who actually views the picture.

Further, the television receiver 10 may have a function that allows the user to select whether or not to apply a result of the favorite settings to an actual display of the broadcast program. This allows the user to switch between viewing pictures based on his/her favorite picture quality and viewing pictures based on the standard picture quality.

Further, the television receiver 10 may be configured as follows: also in a case where the professional settings have been configured, information indicating a result of the simple settings (i.e., basic picture quality information) is stored in the memory 7, so that after information indicating a result of the professional settings (i.e., high-level picture quality correction information) has been cleared, the television receiver 10 returns to the stage where the simple settings were terminated. That is, the trouble of configuring the simple settings again can be saved by returning to the state subsequent to the simple settings after clearing a result of the professional settings, instead of returning to the step previous to the simple settings after clearing a result of the professional settings. That is, the display apparatus according to the present invention may be configured such that when the high-level picture quality correction information creating means has received an instruction to delete the high-level picture quality correction information created, the picture processing means acquires, from a memory section storing basic picture quality information last received by the basic quality information receiving means, the basic picture quality information, corrects picture quality in accordance with the basic picture quality information, and creates a picture to be displayed by the display section. This saves the user the trouble of entering the basic picture quality information again.

Further, although the foregoing description has been given of a case where the professional settings are configured after the simple setting have been configured, the professional settings may be configured without the simple settings having been configured. In that case, the professional settings need only be configured by using, as a benchmark, the default values of coefficients of picture quality correction registered in advance in the television receiver 10.

Further, although the foregoing description has been given of an embodiment in which samples images are presented when the simple settings are configured, it is possible to display a caption "Which level of color saturation would you like, (1) light, (2) normal, or (3) heavy?", instead of sample images. Thus, during the simple settings, i.e., in such a state as to receive the basic picture quality information, it is only necessary to display images corrected in accordance with the candidates for picture quality information or to display a caption.

The foregoing description has been given by taking a television receiver as a particular example. However, it is apparent that the display method in accordance with the invention of the present application can also be applied in the case of television reception by a portable device that allows television viewing, e.g., by a cellular phone, a car navigation system, a portable game terminal, etc.

[Program and a Recording Medium]

Finally, the components of the television receiver 10 may be realized by way of hardware or software as executed by a CPU (central processing unit) as follows:

The television receiver 10 includes a CPU and storage devices (recording media). The CPU executes instructions in programs realizing the functions. The memory devices include a ROM (read only memory) which contains the programs, a RAM (random access memory) to which the programs are loaded in an executable form, and a memory containing the programs and various data. This configuration allows the objective of the present invention to be achieved by a predetermined recording medium.

The recording medium needs only computer-readably contain a program code (executable program, intermediate code program, or source program) for the television receiver 10, which is software realizing the aforementioned functions. The recording medium is mounted to the television receiver 10, so that the television receiver 10 (or CPU, MPU) in the form of a computer retrieves and executes the program code contained in the recording medium thus mounted.

The recording medium, which supplies the program code to the television receiver 10, is not limited to a particular structure or type. The recording medium may be, for example, a tape, such as a magnetic tape or a cassette tape; a magnetic disk, such as a Floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The objective of the present invention can also be achieved by configuring the television receiver 10 to be connectable to a communication network. In this case, the program code is supplied to the television receiver 10 over the communication network. The communication network needs only be a communication network over which the program code can be supplied to the television receiver 10, and is not limited to a particular type or form. Examples of the communication network include the Internet, an intranet, an extranet, a LAN, ISDN, a VAN, a CATV communication network, a virtual private network, a telephone line network, a mobile communication network, a satellite communication network, etc.

A transmission medium constituting the communication network also needs only be any medium through which the program code can be transmitted, and is not limited to a particular configuration or type. Examples of the transmission medium include a cable system such as IEEE 1394, a USB, a power line, a cable TV line, a telephone line, an ADSL (Asymmetric Digital Subscriber Line) line, etc. Alternatively, it is possible to use, as the transmission medium, a wireless system such as infrared rays as in IrDA and a remote controller, Bluetooth (registered trademark), 802.11 wireless, HDR, a cellular-phone network, a satellite line, a terrestrial digital network, etc. It should be noted that the present invention can be achieved in the form of a computer data signal realized by electronic transmission of the program code and embedded in a carrier wave.

Furthermore, the display apparatus according to the present invention is more preferably configured such that the basic picture quality information receiving means receives the basic picture quality information by creating a plurality of images corrected in accordance with the plurality of candidates for the picture quality information, causing the display section to present the plurality of images, and receiving a select instruction to select a single image from among the plurality of images.

Since the basic picture quality information can be selected while viewing images whose picture quality has been actually adjusted, the basic picture quality information can be selected more easily.

Furthermore, the display apparatus according to the present invention is more preferably configured such that the basic picture quality information receiving means associates the plural pieces of picture quality information with plural pieces of the genre information, respectively, and receives the basic picture quality information.

Pieces of basic picture quality information and, by extension, pieces of high-level picture quality correction information can be associated with a plurality of genres, respectively. Therefore, even when there are plural types of genre, pictures can be displayed for each genre with picture quality that suits the user's preference.

Furthermore, the display apparatus according to the present invention is more preferably configured to further include genre information processing means for extracting the genre information from the content, wherein the picture processing means corrects picture quality of a playback of the content in accordance with the high-level picture quality correction information corresponding to the genre information extracted by the genre information processing means.

The genre information processing means extracts and recognizes the genre of content such as a broadcast program to be received, picture quality can be displayed in accordance with high-level picture quality correction information corresponding to that genre. Therefore, a picture can be provided by automatically creating picture quality corresponding to a genre.

Furthermore, the display apparatus according to the present invention is more preferably configured such that when the genre information associated with the content currently displayed by the display section and the genre information to be corrected in accordance with the picture quality correction information when the high-level picture quality correction information creating means is in such a state as to receive the picture quality correction information are different from each other, the picture processing means causes the display section to display a caption explaining that these pieces of the genre information are different from each other.

This allows the user, in entering picture quality information for constituting the high-level picture quality correction information, to know that the image currently displayed by the display section is not derived from the desired genre information.

Furthermore, the display apparatus according to the present invention may be configured such that when the high-level picture quality correction information creating means has received an instruction to delete the high-level picture quality correction information created, the picture processing means acquires, from a memory section storing basic picture quality information last received by the basic quality information receiving means, the basic picture quality information, corrects picture quality in accordance with the basic picture quality information, and creates a picture to be displayed by the display section.

This saves the user the trouble of entering the basic picture quality information again.

The present invention is not limited to the description of the embodiments above, but may be altered by a skilled person in many ways within the scope of the claims. That is, a new embodiment is obtained by combining properly altered technical means within the scope of the claims.

INDUSTRIAL APPLICABILITY

The present invention can be optimally used as a display apparatus such as a television receiver.

REFERENCE SIGNS LIST

10 Television receiver (display apparatus)
19 Picture processing section (picture processing means)
22 Liquid crystal display device (display section)
41 Basic picture quality information receiving section (basic picture quality information receiving means)

42 High-level picture quality correction information creating section (high-level picture quality correction information creating means)

43 Genre information processing section (genre information processing means)

The invention claimed is:

1. A display apparatus for receiving and displaying content with which genre information is associated, the genre information indicating a type of the content, comprising:
a basic picture quality information receiving section configured to associate, with a single piece of said genre information, a plurality of candidates for picture quality information indicating picture quality of a display of the content with which the genre information is associated, and receive an entry, by a user, of basic picture quality information indicating which one of the plurality of candidates for the picture quality information the display of the content is based on;
a high-level picture quality correction information creating section configured to receive an entry, by the user, of picture quality correction information for, by using picture quality based on the basic picture quality information as a benchmark, further correcting the picture quality, and create, in accordance with the basic picture quality information and the picture quality correction information, high-level picture quality correction information for correcting the picture quality; and
a picture processing section configured to correct the picture quality in accordance with the high-level picture quality correction information, and which creates a picture to be displayed by a display section included in the display apparatus, wherein
when the genre information associated with the content currently displayed by the display section and the genre information to be corrected in accordance with the picture quality correction information when the high-level picture quality correction information creating section is in such a state as to receive the picture quality correction information are different from each other, the picture processing section is configured to cause the display section to display a caption explaining that these pieces of said genre information are different from each other.

2. The display apparatus as set forth in claim 1, wherein the basic picture quality information receiving section receives the basic picture quality information by creating a plurality of images corrected in accordance with the plurality of candidates for the picture quality information, causing the display section to present the plurality of images, and receiving a select instruction to select a single image from among the plurality of images.

3. The display apparatus as set forth in claim 1, wherein the basic picture quality information receiving section associates the plural pieces of picture quality information with plural pieces of said genre information, respectively, and receives the basic picture quality information.

4. The display apparatus as set forth in claim 1, further comprising:
a genre information processing section configured to extract the genre information from the content, wherein the picture processing section corrects picture quality of a playback of the content in accordance with the high-level picture quality correction information corresponding to the genre information extracted by the genre information processing section.

5. A non-transitory computer-readable storage medium containing a program which when executed by a computer causes said computer to function as each of the sections of the display apparatus as set forth in claim 1.

6. The display apparatus as set forth in claim 1, wherein when the high-level picture quality correction information creating section has received an instruction to delete the high-level picture quality correction information created, the picture processing section acquires, from a memory section storing basic picture quality information last received by the basic quality information receiving section, the basic picture quality information, corrects picture quality in accordance with the basic picture quality information, and creates a picture to be displayed by the display section.

7. A display apparatus for receiving and displaying content with which genre information is associated, the genre information indicating a type of the content, comprising:
a basic picture quality information receiving section configured to associate, with a single piece of said genre information, a plurality of candidates for picture quality information indicating picture quality of a display of the content with which the genre information is associated, and receive an entry, by a user, of basic picture quality information indicating which one of the plurality of candidates for the picture quality information the display of the content is based on;
a high-level picture quality correction information creating section configured to receive an entry, by the user, of picture quality correction information for, by using picture quality based on the basic picture quality information as a benchmark, further correcting the picture quality, and create in accordance with the basic picture quality information and the picture quality correction information, high-level picture quality correction information for correcting the picture quality; and
a picture processing section configured to correct the picture quality in accordance with the high-level picture quality correction information, and create a picture to be displayed by a display section included in the display apparatus, wherein
when the high-level picture quality correction information creating section has received an instruction to delete the high-level picture quality correction information created, the picture processing section is configured to acquire, from a memory section storing basic picture quality information last received by the basic quality information receiving section, the basic picture quality information, correct picture quality in accordance with the basic picture quality information, and create a picture to be displayed by the display section.

8. The display apparatus as set forth in claim 7, wherein the basic picture quality information receiving section receives the basic picture quality information by creating a plurality of images corrected in accordance with the plurality of candidates for the picture quality information, causing the display section to present the plurality of images, and receiving a select instruction to select a single image from among the plurality of images.

9. The display apparatus as set forth in claim 7, wherein the basic picture quality information receiving section associates the plural pieces of picture quality information with plural pieces of said genre information, respectively, and receives the basic picture quality information.

10. The display apparatus as set forth in claim 7, further comprising:
a genre information processing section configured to extract the genre information from the content, wherein the picture processing section corrects picture quality of a playback of the content in accordance with the high-level picture quality correction information corresponding to the genre information extracted by the genre information processing section.

11. A non-transitory computer-readable storage medium containing a program which when executed by a computer causes said computer to function as each of the sections of the display apparatus as set forth in claim 7.

* * * * *